(12) United States Patent
Chen et al.

(10) Patent No.: US 8,335,053 B2
(45) Date of Patent: Dec. 18, 2012

(54) INTEGRATED TOUCH-DOWN PAD AND TOUCH-DOWN SENSOR

(75) Inventors: Yingjian Chen, Fremont, CA (US);
David J. Seagle, Morgan Hill, CA (US);
Samuel W. Yuan, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 125 days.

(21) Appl. No.: 12/914,883

(22) Filed: Oct. 28, 2010

(65) Prior Publication Data

US 2012/0105999 A1     May 3, 2012

(51) Int. Cl.
*G11B 21/02* (2006.01)
(52) U.S. Cl. .................................................. 360/235.4
(58) Field of Classification Search ................ 360/235.4
See application file for complete search history.

(56) References Cited

U.S. PATENT DOCUMENTS

| | | | |
|---|---|---|---|
| 7,492,543 B2 | 2/2009 | Mitsunaga et al. | |
| 7,589,928 B2 | 9/2009 | Roy et al. | |
| 7,633,703 B2 | 12/2009 | Ota | |
| 8,085,490 B2 * | 12/2011 | Franca-Neto et al. | 360/75 |
| 8,125,728 B2 * | 2/2012 | Kurita et al. | 360/75 |
| 2007/0230015 A1 | 10/2007 | Yamashita et al. | |
| 2008/0088972 A1 | 4/2008 | Sasaki et al. | |
| 2008/0231994 A1 | 9/2008 | Kimura et al. | |
| 2009/0144966 A1 | 6/2009 | Zheng | |
| 2009/0147410 A1 | 6/2009 | Jiang et al. | |
| 2009/0251828 A1 | 10/2009 | Schreck et al. | |
| 2009/0262460 A1 | 10/2009 | Hanchi et al. | |
| 2009/0268335 A1 | 10/2009 | Huang et al. | |
| 2010/0073799 A1 | 3/2010 | Ionescu | |
| 2010/0097721 A1 * | 4/2010 | Baumgart et al. | 360/235.4 |
| 2010/0157454 A1 * | 6/2010 | Chen et al. | 360/30 |
| 2010/0157477 A1 * | 6/2010 | Morinaga et al. | 360/125.12 |
| 2011/0141603 A1 * | 6/2011 | Kazusawa et al. | 360/46 |
| 2011/0149428 A1 * | 6/2011 | Franca-Neto et al. | 360/75 |
| 2011/0157736 A1 * | 6/2011 | Contreras et al. | 360/29 |
| 2012/0099218 A1 * | 4/2012 | Kurita et al. | 360/59 |

FOREIGN PATENT DOCUMENTS

JP    2008/077751 A    4/2008

* cited by examiner

*Primary Examiner* — Mark Blouin
(74) *Attorney, Agent, or Firm* — Zilka-Kotab, PC

(57) ABSTRACT

In one general embodiment, a magnetic head includes a touch-down pad, comprising at least one shielding element positioned between a leading edge of a main magnetic pole and a trailing edge of a lower return pole; an embedded contact sensor (ECS) in an electrically isolating layer, the ECS positioned near an ABS side of the magnetic head and between the leading edge of the main magnetic pole and the trailing edge of the lower return pole; and a first thermal fly-height control (TFC) element positioned away from the ABS side of the magnetic head. Additional systems and methods are also presented.

25 Claims, 13 Drawing Sheets

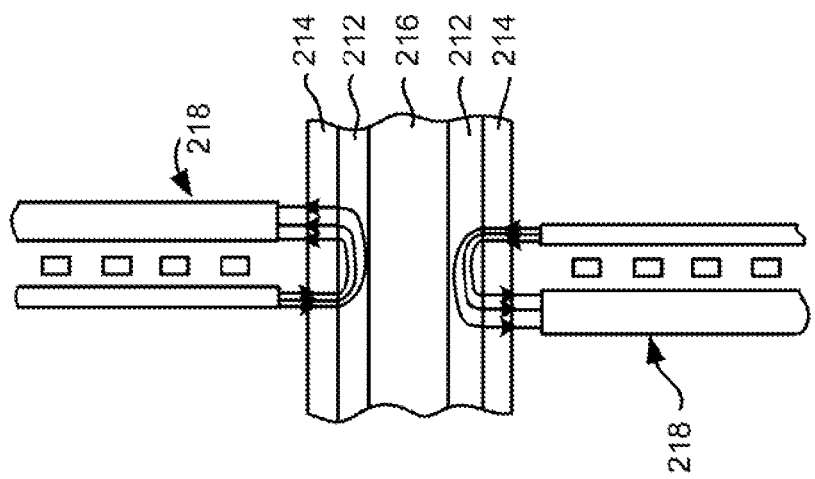
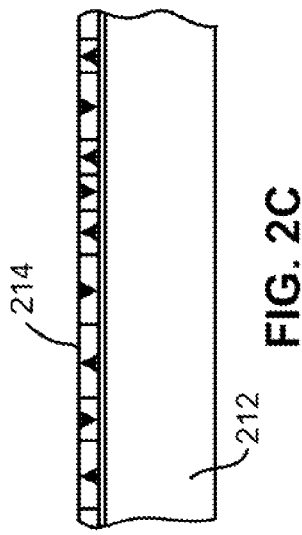
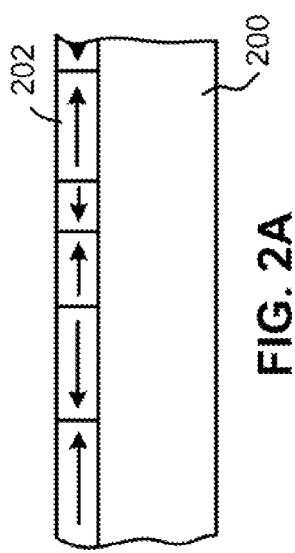
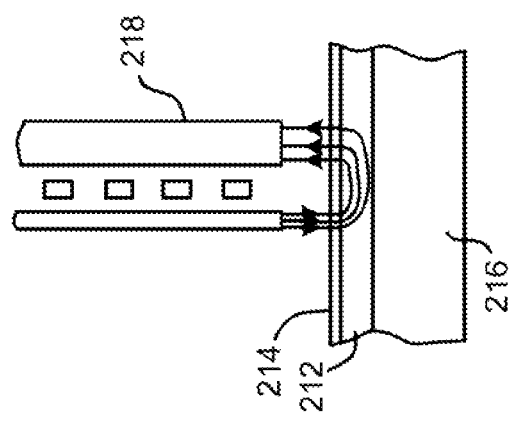
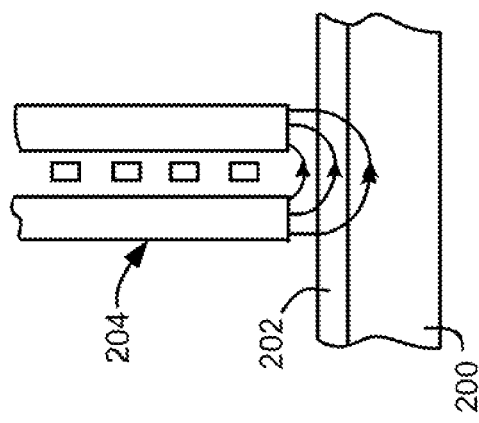

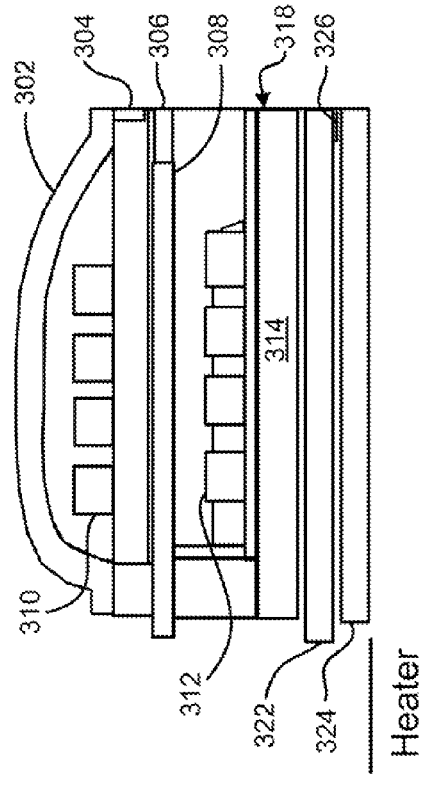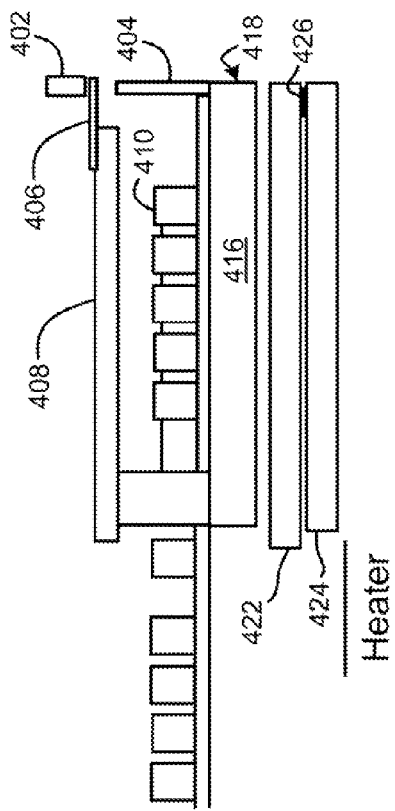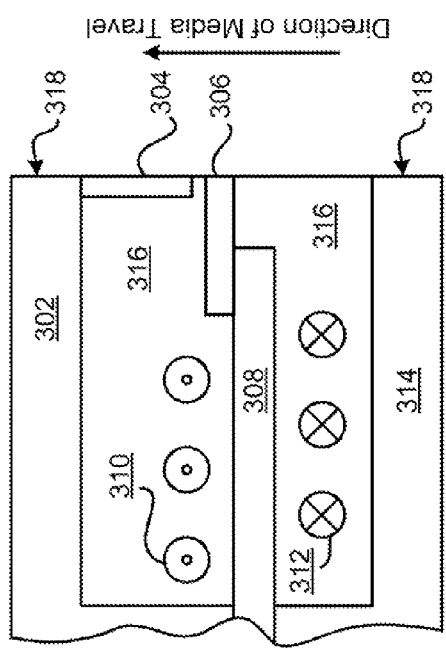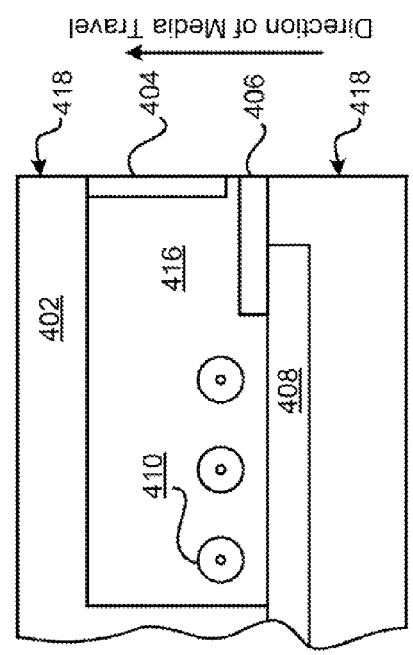

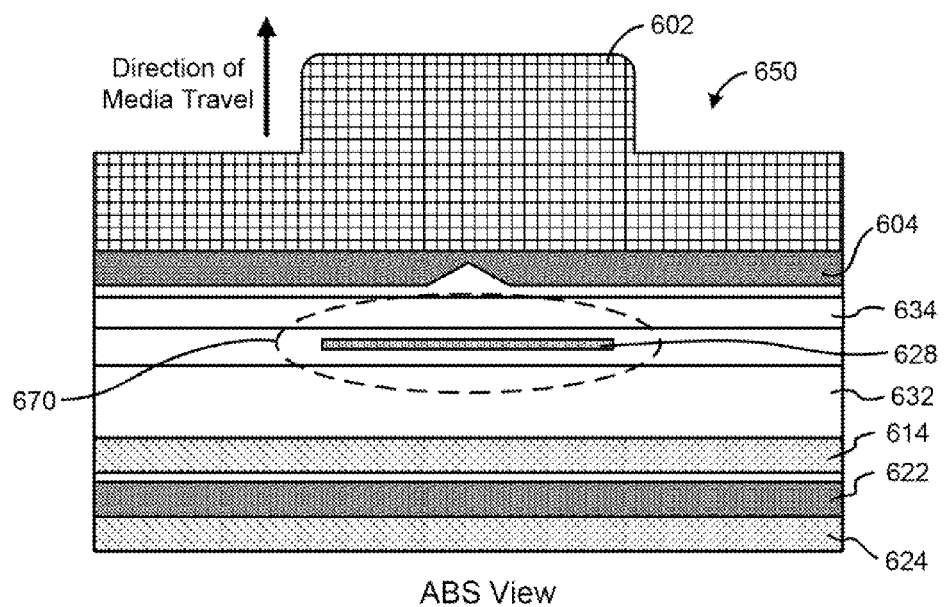
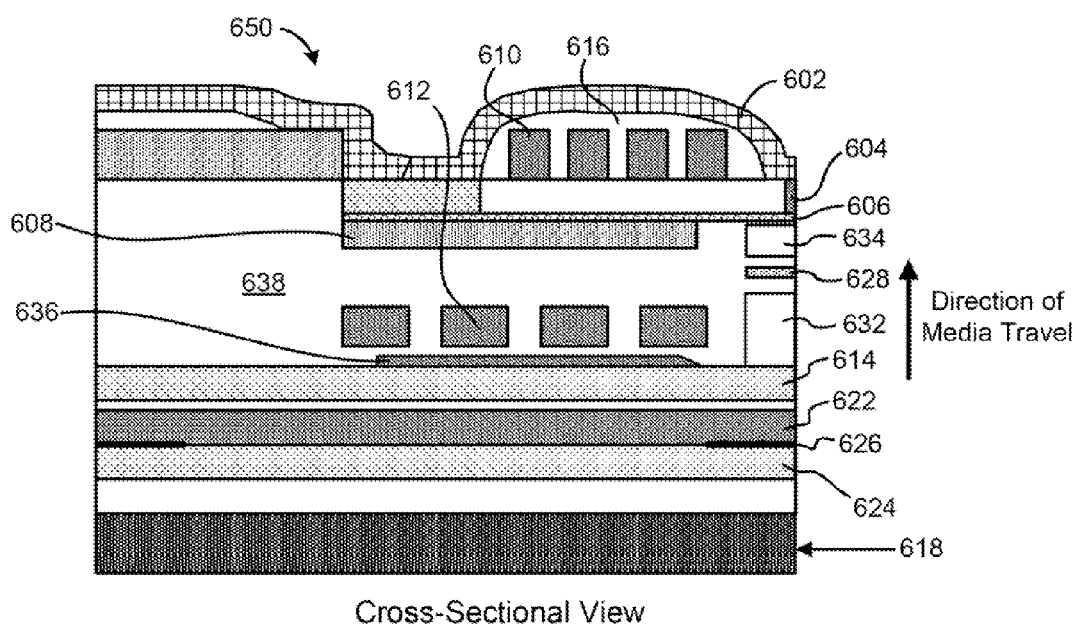
FIG. 6A

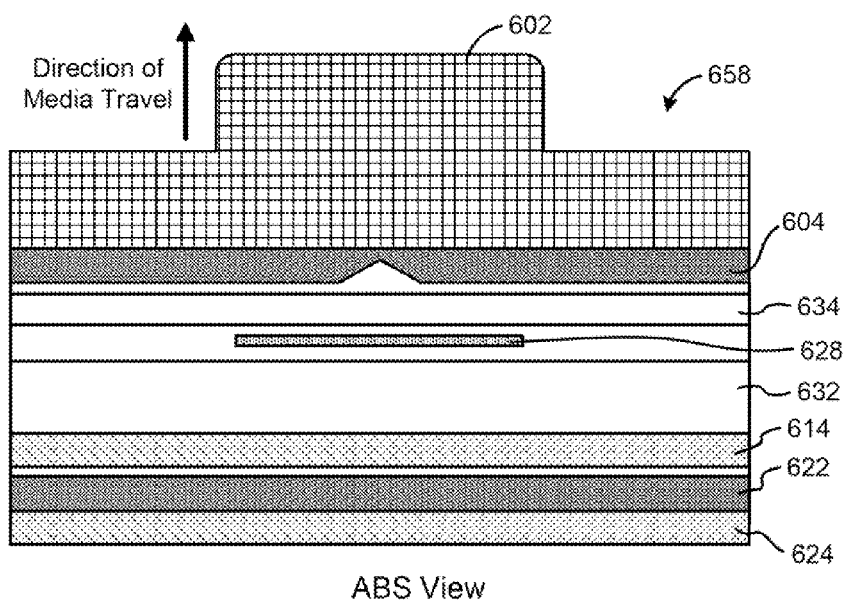
ABS View
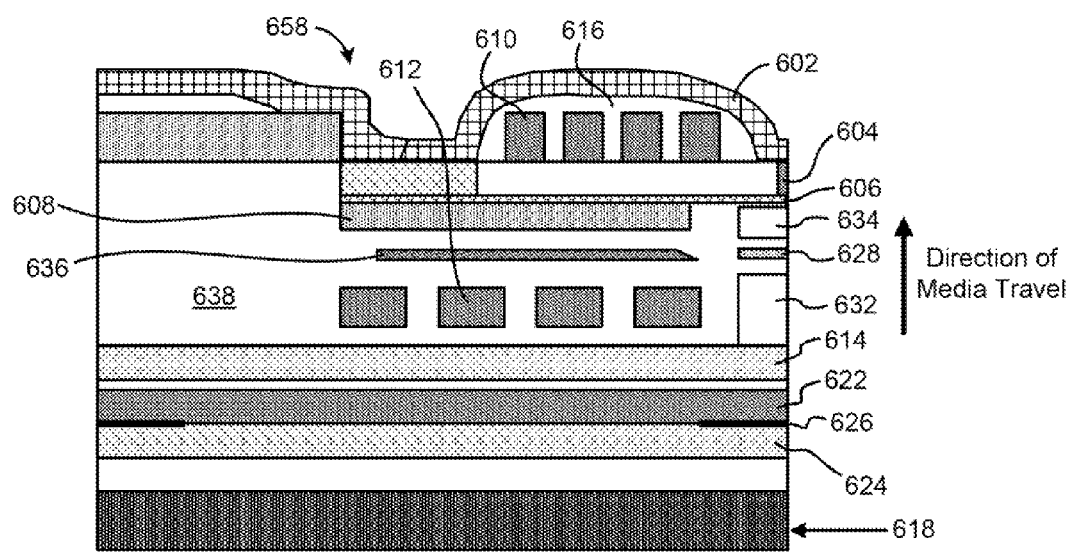
Cross-Sectional View
FIG. 6E

INTEGRATED TOUCH-DOWN PAD AND TOUCH-DOWN SENSOR

FIELD OF THE INVENTION

The present invention relates to data storage systems, and more particularly, this invention relates to magnetic recording media and magnetic recording heads for reading and/or writing to magnetic recording media.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

In typical systems, recession is created after lapping and pre-carbon etching processes. This creates a distance between the transducers and the disk surface. Thermal fly-height control (TFC) is a method of altering this distance between the transducers and the disk surface by heating the components of the reader/writer causing thermal expansion of the materials, which results in the reader/writer transducers protruding closer to the surface of the hard disk. The transducers are moved closer to the disk surface to enable proper reading and writing of the tracks.

In some systems, the magnetic head includes an Embedded Contact Sensor (ECS) which is embedded in a layer of alumina (the alumina provides electrical isolation for the ECS). The ECS allows for determination of the distance between the magnetic head and the rotating disk surface. The ECS typically is constructed of a resistive film which detects contact through a change in resistance. This design, however, has a limited ability to detect touch-down (contact between the magnetic head and the rotating disk) due to several factors, including: (1) the alumina may be recessed where the ECS is typically embedded; (2) the location of the ECS may not be a minimum clearance point between the magnetic head and the rotating disk; and (3) the ECS sensor may be subject to wear if it locally protrudes from the magnetic head (e.g., it is the minimum clearance point). Of course, there are other factors which limit the usefulness and/or effectiveness of a conventional ECS design as well, which will not be discussed here.

Therefore, there is a need to design an integrated touch-down pad and touch-down sensor to ensure more effective touch-down detection and increase reliability of touch-down detection, and improve longevity of the touch-down sensor.

SUMMARY OF THE INVENTION

A magnetic head according to one embodiment includes a touch-down pad, comprising at least one shielding element positioned between a leading edge of a main magnetic pole and a trailing edge of a lower return pole; an embedded contact sensor (ECS) in an electrically isolating layer, the ECS positioned near an ABS side of the magnetic head and between the leading edge of the main magnetic pole and the trailing edge of the lower return pole; and a first thermal fly-height control (TFC) element positioned away from the ABS side of the magnetic head.

A magnetic head according to another embodiment includes an embedded contact sensor (ECS) in an electrically isolating layer positioned near an ABS side of the magnetic head and between a leading edge of a main magnetic pole and a trailing edge of a lower return pole; and a touch-down pad, comprising: a leading edge shield (LES) positioned on the ABS side of the magnetic head between the leading edge of the main magnetic pole and a trailing edge of the ECS, wherein a leading edge of the LES is isolated from the ECS by the electrically isolating layer, and wherein the LES surrounds one to three sides of the ECS; and a P1 pedestal positioned on the ABS side of the magnetic head and on the trailing edge of the lower return pole, wherein a trailing edge of the P1 pedestal is isolated from the ECS by the electrically isolating layer. The head also includes a first thermal fly-height control (TFC) element positioned away from the ABS side of the magnetic head and below a lower shield layer; and a second TFC element positioned between the lower return pole and a coil layer.

A method for forming a magnetic head according to one embodiment includes forming a first thermal fly-height control (TFC) element above a substrate away from an ABS side of a magnetic head; forming a lower return pole above the substrate; forming a first touch-down (TD) pad on the ABS side of the magnetic head above the lower return pole; forming an embedded contact sensor (ECS) on the ABS side of the magnetic head in an electrically isolating layer above the lower return pole; and forming a main magnetic pole above the ECS.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIG. 6A is a cross-sectional view and an ABS view of a portion of a magnetic head, according to one embodiment.

FIG. 6E is a cross-sectional view and an ABS view of a portion of a magnetic head, according to one embodiment.

DETAILED DESCRIPTION

Figure 1:
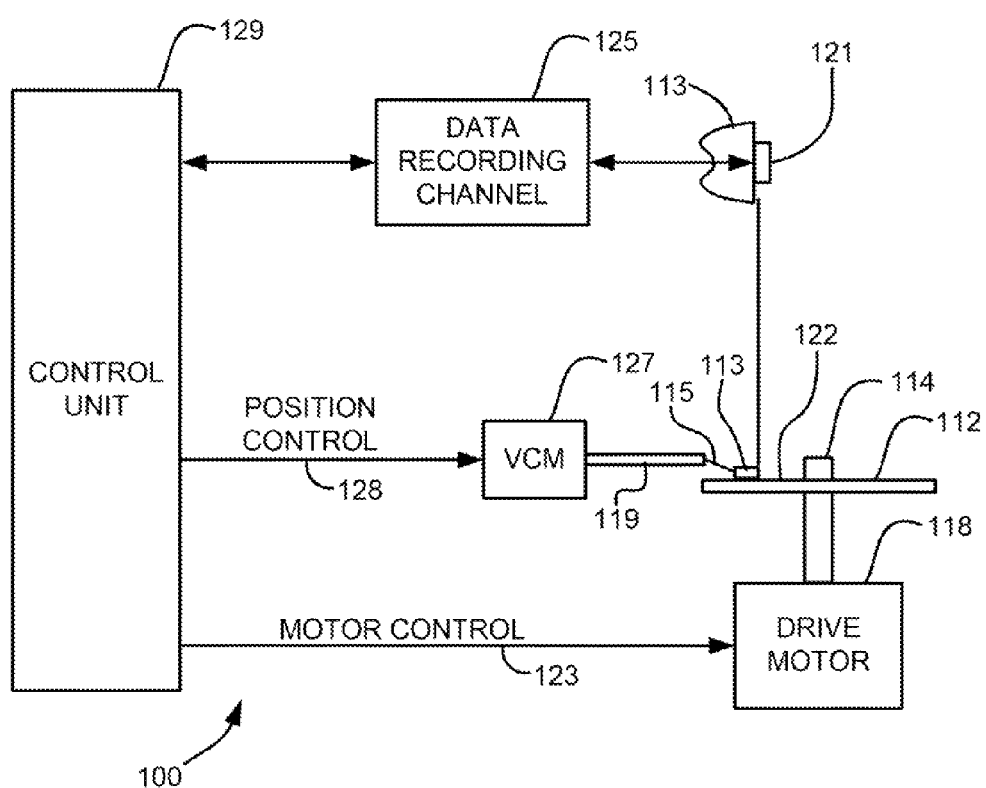
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic head includes a touch-down pad, comprising at least one shielding element positioned between a leading edge of a main magnetic pole and a trailing edge of a lower return pole; an embedded contact sensor (ECS) in an electrically isolating layer, the ECS positioned near an ABS side of the magnetic head and between the leading edge of the main magnetic pole and the trailing edge of the lower return pole; and a first thermal fly-height control (TFC) element positioned away from the ABS side of the magnetic head.

In another general embodiment, a magnetic head includes an embedded contact sensor (ECS) in an electrically isolating layer positioned near an ABS side of the magnetic head and between a leading edge of a main magnetic pole and a trailing edge of a lower return pole; and a touch-down pad, comprising: a leading edge shield (LES) positioned on the ABS side of the magnetic head between the leading edge of the main magnetic pole and a trailing edge of the ECS, wherein a leading edge of the LES is isolated from the ECS by the electrically isolating layer, and wherein the LES surrounds one to three sides of the ECS; and a P1 pedestal positioned on the ABS side of the magnetic head and on the trailing edge of the lower return pole, wherein a trailing edge of the P1 pedestal is isolated from the ECS by the electrically isolating layer. The head also includes a first thermal fly-height control (TFC) element positioned away from the ABS side of the magnetic head and below a lower shield layer; and a second TFC element positioned between the lower return pole and a coil layer.

In yet another general embodiment, a method for forming a magnetic head includes forming a first thermal fly-height control (TFC) element above a substrate away from an ABS side of a magnetic head; forming a lower return pole above the substrate; forming a first touch-down (TD) pad on the ABS side of the magnetic head above the lower return pole; forming an embedded contact sensor (ECS) on the ABS side of the magnetic head in an electrically isolating layer above the lower return pole; and forming a main magnetic pole above the ECS.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider 113. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Figure 5:
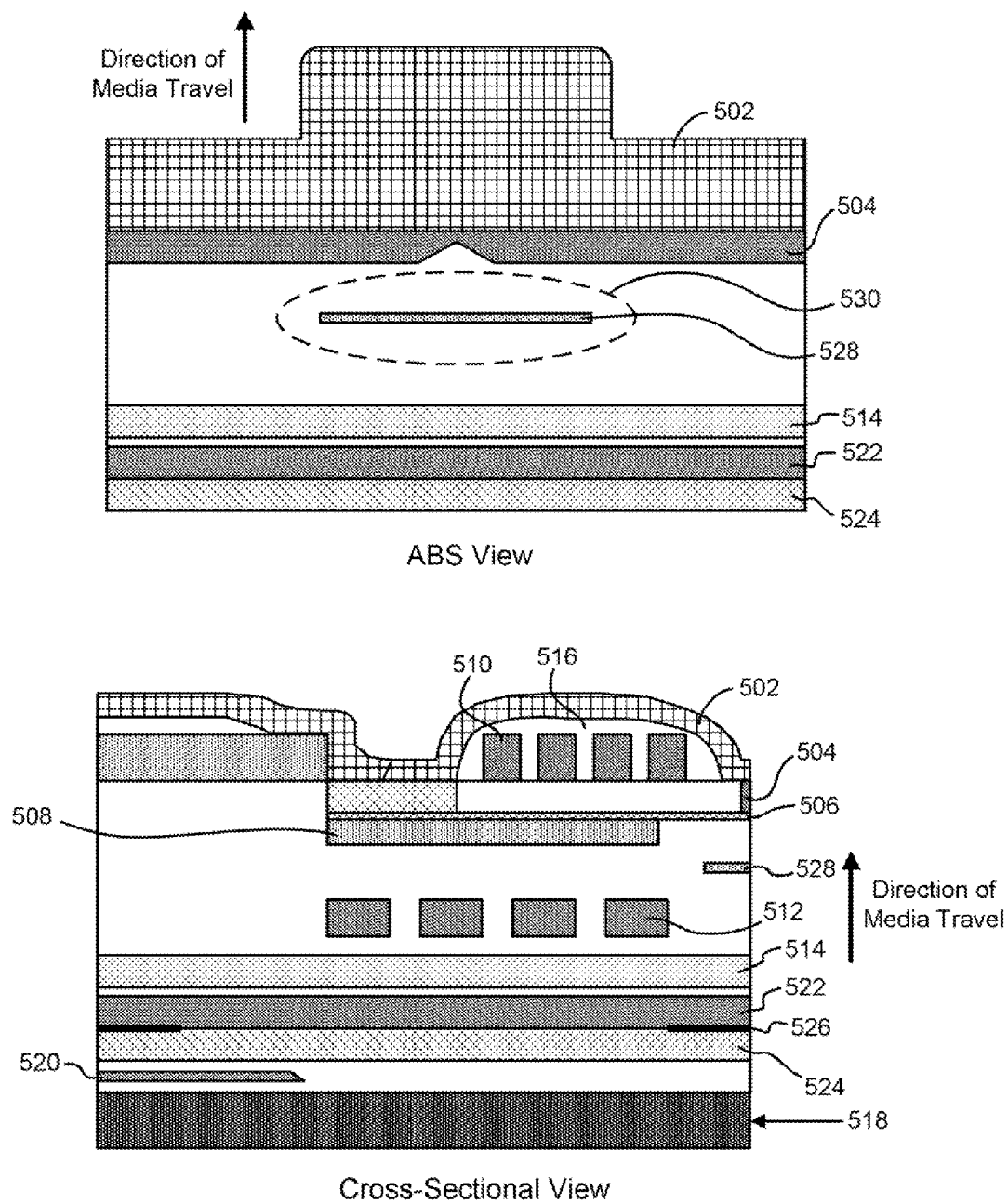
FIG. 5 is a cross-sectional view and an ABS view of a portion of a magnetic head, according to the prior art.

Referring to FIG. 5, a cross-sectional view and an ABS view of a portion of a magnetic head 500 are shown according to the prior art. Each layer in FIG. 5 (and other FIGS.) has a leading edge side and a trailing edge side depending on which side of the layer would encounter a spot on a medium moving in the direction of the arrow indicating the direction of media travel. In the direction of media travel shown in FIG. 5, the leading edge is on the bottom of the respective layer, and the trailing edge is on the top of the respective layer.

As can be seen from this arrangement, the magnetic head 500 includes helical coils 510 and 512 which are used to create magnetic flux in the stitch pole 508, which then delivers that flux to the main pole 506. Coils 510 indicate coils extending out from the page, while coils 512 indicate coils extending into the page. Stitch pole 508 may be recessed from the ABS 518. Insulation 516 surrounds the coils and may provide support for some of the elements of the magnetic head 500. The direction of the media travel, as indicated by the arrow to the right of the structure, illustrates how a point on the media moves past the lower return pole 514 first, then the stitch pole 508, the main pole 506, the wrap around shield 504, and then the upper return pole 502. Each of these components may have a portion in contact with the ABS 518, and more components may be present than those described above.

Perpendicular writing is achieved by forcing flux through the stitch pole 508 into the main pole 506 and then to the surface of the disk positioned towards the ABS 518. The wrap around shield 504 and the lower return pole 514 flank the stitch pole 508 and main pole 506. Also, upper shield layer 522, and lower shield layer 524 flank a sensor 526, if one is present in the magnetic head 500. The magnetic head 500 also includes a thermal fly-height control (TFC) element 520 positioned in a layer adjacent to the lower shield layer 524 and away from the ABS 518. The TFC element may be used to heat components of the magnetic head 500 to achieve touch-down (TD) with the disk (contact between the magnetic head and the rotating disk), which may be monitored by an Embedded Contact Sensor (ECS) 528. As indicated in the ABS view, the TD area 530 is generally near the ECS 528, while the sensor 526 and the main pole 506 are recessed from the ABS 518. This design, however, has a limited ability to detect TD due to several factors, including: (1) the alumina (the portions surrounding the ECS 528) may be recessed where the ECS 528 is typically embedded; (2) the location of the ECS 528 may not be a minimum clearance point between the magnetic head 500 and the rotating disk; and (3) the ECS 528 may be subject to wear if it locally protrudes from the magnetic head 500 (e.g., it is the minimum clearance point).

To avoid and/or minimize the problems associated with prior art ECS designs, according to one embodiment, metal pads may be fabricated adjacent to the ECS (or TD sensor), such that the TD pad protrudes, relative to the immediately adjacent layers, and becomes a minimum clearance point of the magnetic head during HDD operation. This ensures detectability and reliability of the TD sensor. The lowest clearance point of the TD pad is achieved by a protruded topography of the TD pad, and/or by choosing a particular TFC location(s).

According to some embodiments, an integrated TD pad and a TD sensor are included in a magnetic head for use with a magnetic disk. In one approach, the TD pad may be located between a read element and a write element to ensure TD on the TD pad upon applying TD power to the TFC element (e.g., a resistor). Also, the TD sensor may be located in close vicinity of the TD pad, e.g., just above, below, or embedded within the TD pad. in addition, the TFC element and the ABS topography profile are designed so that consistent TD may be achieved on the TD pad with minimum reader element and minimum writer element spacing loss. According to one embodiment, it may be preferred to use a NiFe alloy with a slightly higher Fe content than the Fe content of the P1 pedestal and the Fe content of the wrap around shield (WAS) so that the TD pad has more protrusion upon heating, e.g., about 0.2 nm to about 0.3 nm of protrusion.

The TD pad(s), in one embodiment, comprise a leading edge shield (LES) of a main pole and/or a P1 pedestal in front of a first coil. The P1 pedestal may be magnetically coupled to or separated from the LES. Other TD pad locations and configurations will soon become apparent. The TD pads may be planar and/or may wrap around the TD sensor element. The TFC may be located in several places, such as: above the first coil, above the P1 pedestal, under a S1 shield, etc. It is also possible to have multiple TFC elements coupled in parallel, in serial, or operating separately. Several embodiments using variations of this design are presented in FIGS. 6A-6H.

Referring to FIGS. 6A-6H, a cross-sectional view and an ABS view of a portion of various magnetic heads are shown according to several embodiments. The magnetic head includes coils 610 and 612 which are used to create magnetic flux in the stitch pole 608, which then delivers that flux to the main magnetic pole 606, which may be recessed from the ABS 618. Stitch pole 608 may also be recessed from the ABS 618. Insulation 616 surrounds the coils and may provide support for some of the elements of the magnetic head.

Perpendicular writing is achieved by forcing flux through the stitch pole 608 into the main pole 606 and then to the surface of the disk positioned towards the ABS 618. The WAS 604 and the lower return pole 614 flank the stitch pole 608 and main pole 606. Also, upper shield layer 622, and lower shield layer 624 flank a sensor 626, if one is present in the magnetic head. The magnetic head may also include a TFC element 620 positioned in a layer adjacent to the lower shield layer 624 and away from the ABS 618 and/or a TFC element 636 positioned outside of the coils and away from the ABS 618 near the main pole 606 and/or positioned inside of the coils possibly in line with the ECS 628, or in any other position as would be apparent to one of skill in the art upon reading the present descriptions. The TFC element(s) 620, 636 may be used to heat components of the magnetic head to achieve touch-down (TD) with the disk (contact between the magnetic head and the rotating disk), which may be monitored by an ECS 628. As indicated in the ABS view of FIG. 6A, the TD area 670 may be near the ECS 628. Referring again to FIGS. 6A-6H, an electrically isolating layer 638 is formed around the coils 612, and between some of the elements near the ABS 618, such as the ECS 628. The electrically isolating layer 638 may be a multilayer, according to some approaches.

In one embodiment, the electrically isolating layer 638 and the insulation 616 may be alumina, but any other insulating and/or electrically isolating material may be used as known in the art.

In some embodiments, which include multiple TFC elements, e.g., 620, 636, each TFC element may provide a different amount of thermal heating to the magnetic head, thereby causing components of the magnetic head to expand by different amounts based on their individual thermal expansion coefficients. In other embodiments, different currents may be provided to similar TFC elements, thereby providing different thermal heating. Of course, each TFC element used may also provide the same or close to the same amount of heat to the magnetic head, in other approaches.

Now referring to FIG. 6A, a cross-sectional view and an ABS view of a portion of a magnetic head 650 are shown according to one embodiment. In this embodiment, the TFC element 636 is positioned outside of the coils and away from the ABS 618 near a leading edge side of the main pole 606, and closer to the stitch pole 608, main pole 606, ABS 618, and ECS 628, thereby increasing the protrusion effect on one or more of these elements, as compared to the prior art. Of course, upon reading the descriptions herein, many other locations for placement of the TFC element may become apparent to one of skill in the art, such as between the poles 606, 608, above or below the lower coil 612, behind the lower coil 612, etc. In addition, the magnetic head 650 includes a TD pad in the form of a P1 pedestal 632 positioned near a leading edge side of the ECS 628 and a leading edge shield (LES) 634 near a trailing edge side of the ECS 628, which may provide wear resistance, among other advantages, to the ECS 628. The P1 pedestal 632 extends to and contacts the lower return pole 614.

Figure 6B:
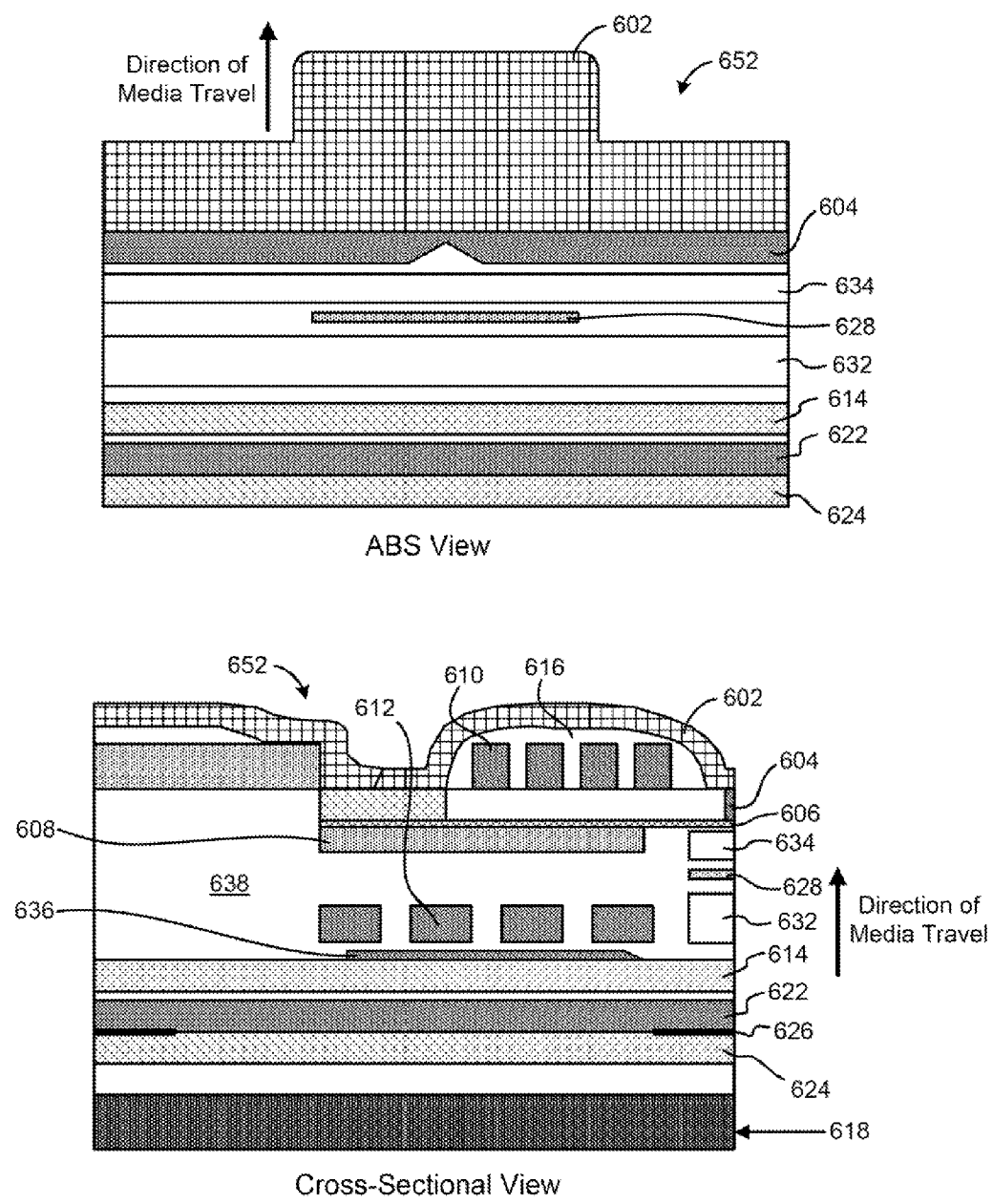
FIG. 6B is a cross-sectional view and an ABS view of a portion of a magnetic head, according to one embodiment.

Now referring to FIG. 6B, a cross-sectional view and an ABS view of a portion of a magnetic head 652 are shown according to one embodiment. In this embodiment, the TFC element 636 is positioned under the coils and away from the ABS 618 near the trailing edge side of the lower return pole 614, and closer to the stitch pole 608, main pole 606, ABS 618, and ECS 628, thereby increasing the protrusion effect on one or more of these elements as compared to the prior art. In addition, the magnetic head 652 includes a TD pad in the form of a P1 pedestal 632 positioned near the leading edge side of the ECS 628 and a LES 634 near the trailing edge side of the ECS 628, which provide wear resistance, among other advantages, to the ECS 628. The P1 pedestal 632 extends away from the ECS 628, but does not contact the lower return pole 614.

Figure 6C:
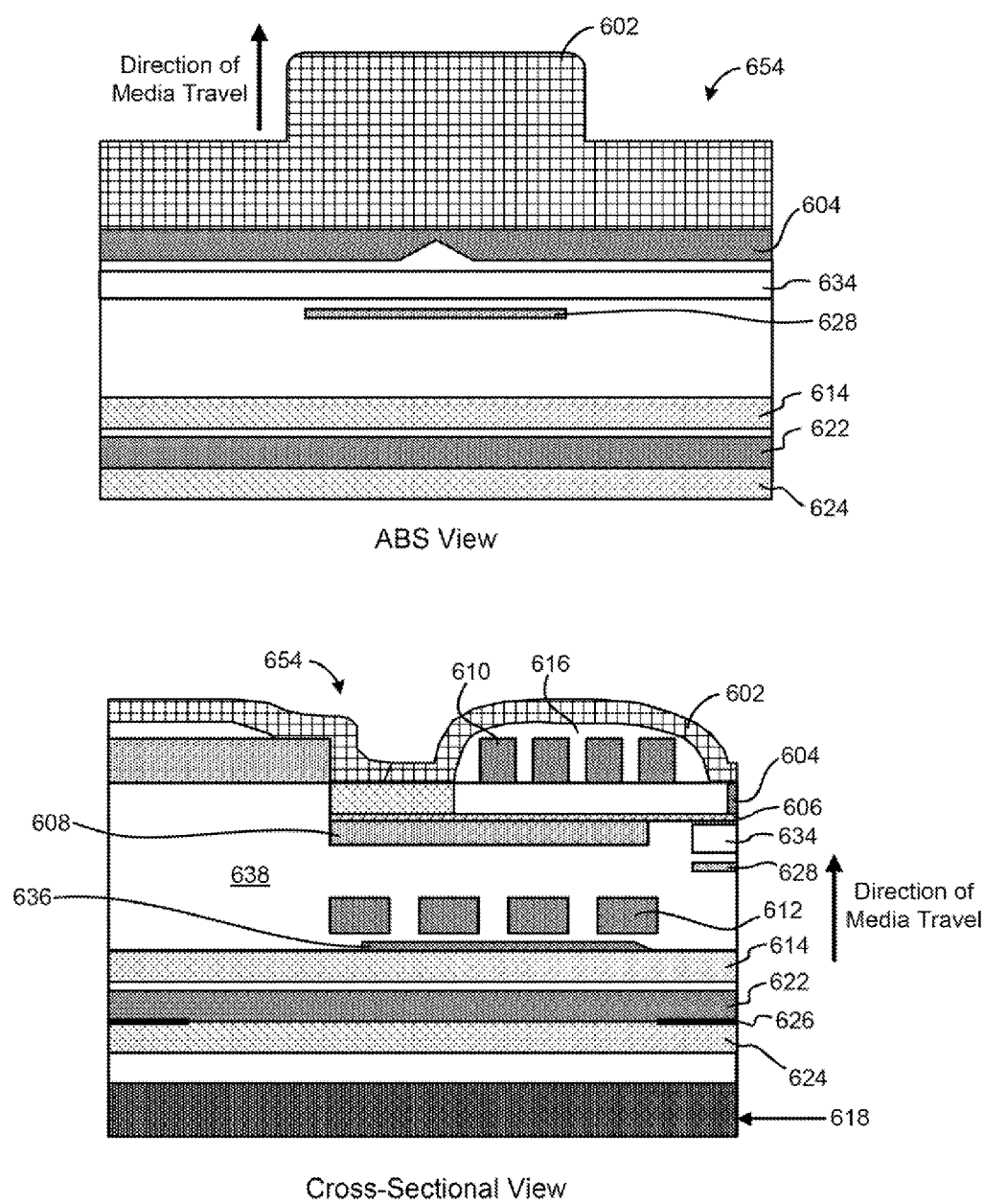
FIG. 6C is a cross-sectional view and an ABS view of a portion of a magnetic head, according to one embodiment.

Now referring to FIG. 6C, a cross-sectional view and an ABS view of a portion of a magnetic head 654 are shown according to one embodiment. In this embodiment, the TFC element 636 is positioned outside of the coils and away from the ABS 618 near the leading edge side of the main pole 606, and closer to the stitch pole 608, main pole 606, ABS 618, and ECS 628, thereby increasing the protrusion effect on one or more of these elements as compared to the prior art. In addition, the magnetic head 654 includes a LES 634 near the trailing edge side of the ECS 628, which provides wear resistance, among other advantages, to the ECS 628.

Figure 6D:
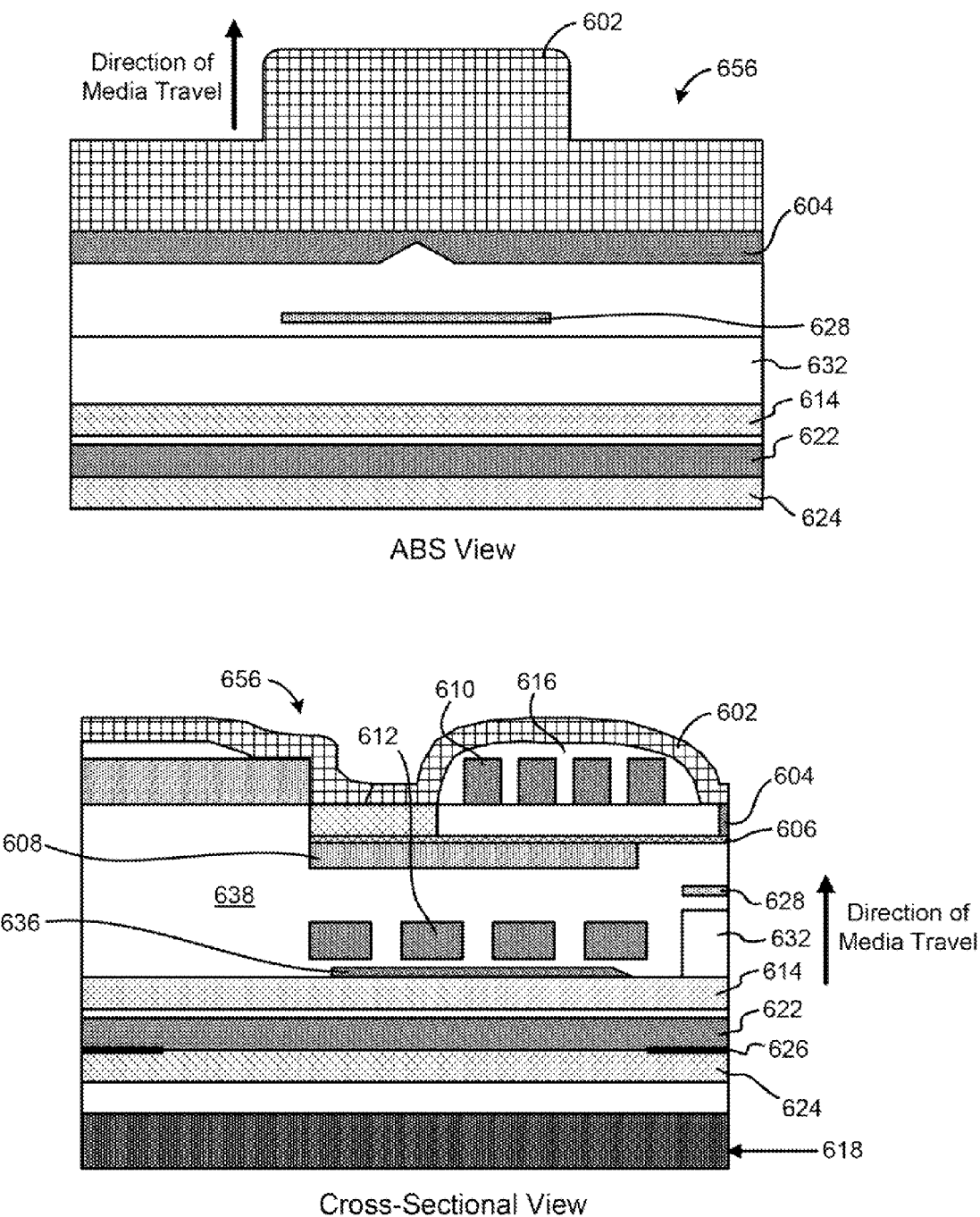
FIG. 6D is a cross-sectional view and an ABS view of a portion of a magnetic head, according to one embodiment.

Now referring to FIG. 6D, a cross-sectional view and an ABS view of a portion of a magnetic head 656 are shown according to one embodiment. In this embodiment, the TFC element 636 is positioned outside of the coils and away from the ABS 618 near the leading edge side of the main pole 606, and closer to the stitch pole 608, main pole 606, ABS 618, and ECS 628, thereby increasing the protrusion effect on one or more of these elements as compared to the prior art. In addition, the magnetic head 656 includes a P1 pedestal 632 positioned near the leading edge side of the ECS 628, which provides wear resistance, among other advantages, to the ECS 628. The P1 pedestal 632 extends away from the ECS 628, and contacts the lower return pole 614.

Now referring to FIG. 6E, a cross-sectional view and an ABS view of a portion of a magnetic head 658 are shown according to one embodiment. In this embodiment, the TFC element 636 is positioned inside of or between the coils, and possibly in line with the ECS 628 (as shown in FIG. 6E), and closer to the stitch pole 608, main pole 606, ABS 618, and ECS 628, thereby increasing the protrusion effect on one or more of these elements. In addition, the magnetic head 658 includes a P1 pedestal 632 positioned near the leading edge side of the ECS 628 and a LES 634 near the trailing edge side of the ECS 628, which provide wear resistance, among other advantages, to the ECS 628. The P1 pedestal 632 extends and contacts the lower return pole 614.

According to one embodiment having the TFC 636 inside of or between the coils, such as that shown in FIG. 6E, the TD sensor (ECS 628) may be between the P1 pedestal 632 and the LES 634, and a process flow to manufacture such as magnetic head 658 may include: (1) fabricating the reader 626 and layers up to the P1 pedestal 632; (2) fabricating the P1 pedestal 632 (e.g., by plating using a photoresist frame); (3) fabricating the first coil 612; (4) covering the surface of the structure with an insulating layer and chemical-mechanical polishing (CMP) of the surface; (5) fabricating the TD sensor (ECS) 628 with leads; (6) fabricating the TFC element 636 and insulation; (7) fabricating the LES 634 (e.g., by plating using a photoresist frame); (8) CMP of the LES 634; and (9) fabricating a writer main pole 606 and the remainder of the magnetic head 658.

Figure 6F:
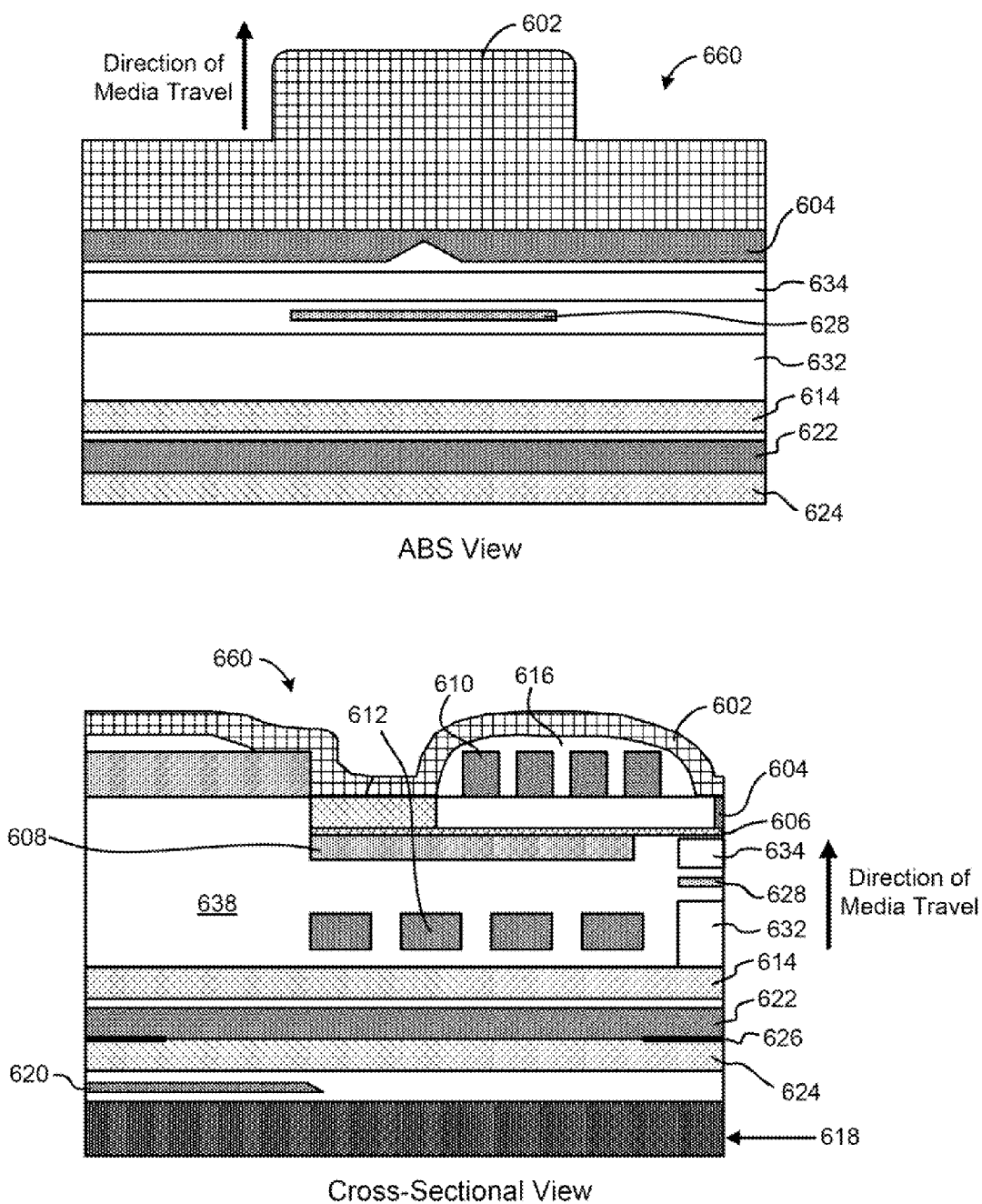
FIG. 6F is a cross-sectional view and an ABS view of a portion of a magnetic head, according to one embodiment.

Now referring to FIG. 6F, a cross-sectional view and an ABS view of a portion of a magnetic head 660 are shown according to one embodiment. In this embodiment, the TFC element 620 is positioned near a leading edge side of the lower return pole 614, more particularly near a leading edge side of the lower shield layer 624. In addition, the magnetic head 660 includes a P1 pedestal 632 positioned near the leading edge side of the ECS 628 and a LES 634 near the trailing edge side of the ECS 628, which provide wear resistance, among other advantages, to the ECS 628. The P1 pedestal 632 extends and contacts the lower return pole 614.

Figure 6G:
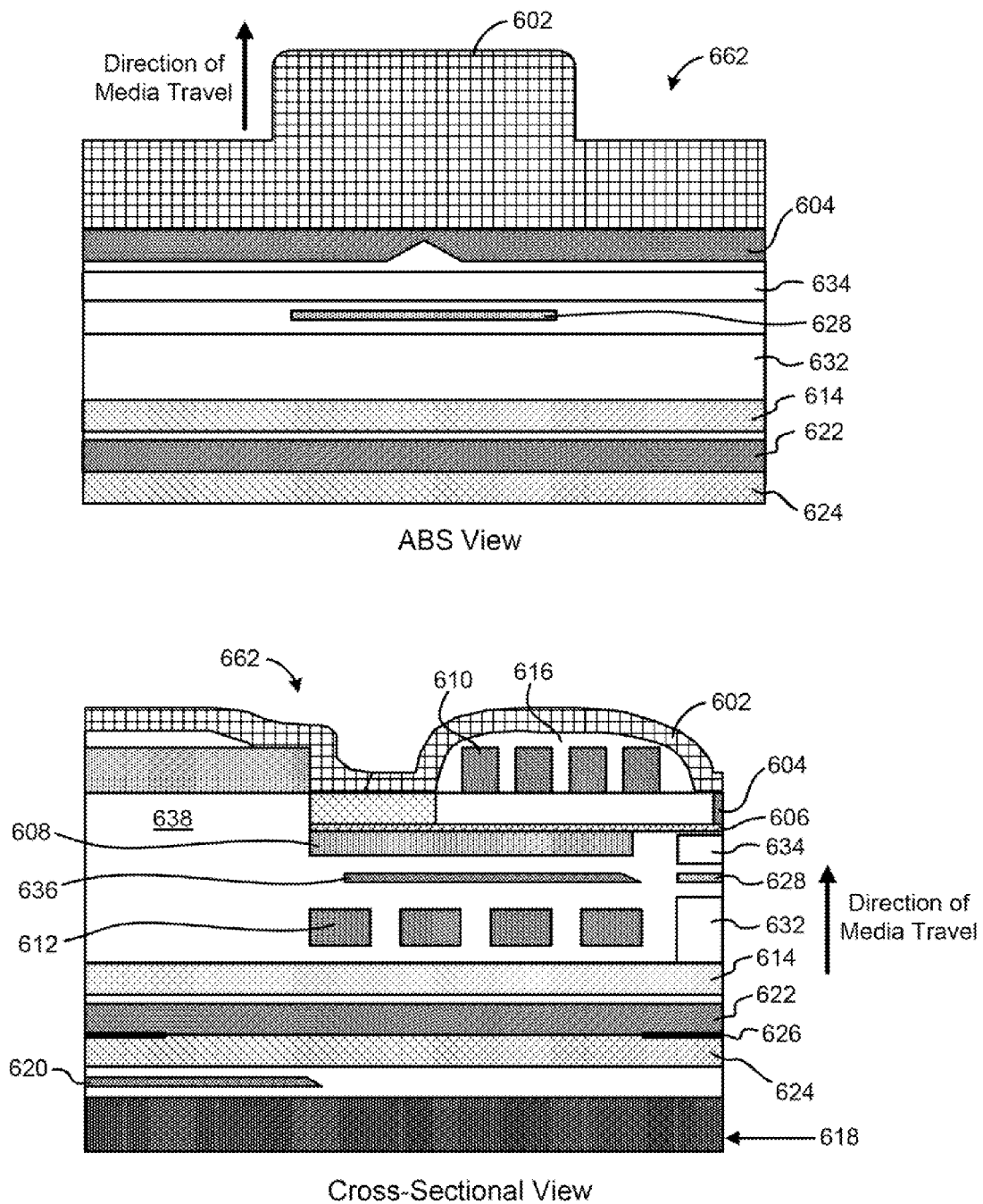
FIG. 6G is a cross-sectional view and an ABS view of a portion of a magnetic head, according to one embodiment.

Now referring to FIG. 6G, a cross-sectional view and an ABS view of a portion of a magnetic head 662 are shown according to one embodiment. In this embodiment, a first TFC element 636 is positioned inside of or between the coils, and possibly in line with the ECS 628 (as shown in FIG. 6G), and closer to the stitch pole 608, main pole 606, ABS 618, and ECS 628 than in the embodiment shown in FIG. 6C, thereby increasing the protrusion effect on one or more of these elements. Also, the magnetic head 662 includes a second TFC element 620 positioned near a leading edge side of the lower return pole 614. In addition, the magnetic head 662 includes a P1 pedestal 632 positioned near the leading edge side of the ECS 628 and a LES 634 near the trailing edge side of the ECS 628, which provide wear resistance, among other advantages, to the ECS 628. The P1 pedestal 632 extends and contacts the lower return pole 614, but is not limited to such an arrangement, as it may be isolated from the lower return pole 614 by electrically isolating layer 638.

Figure 6H:
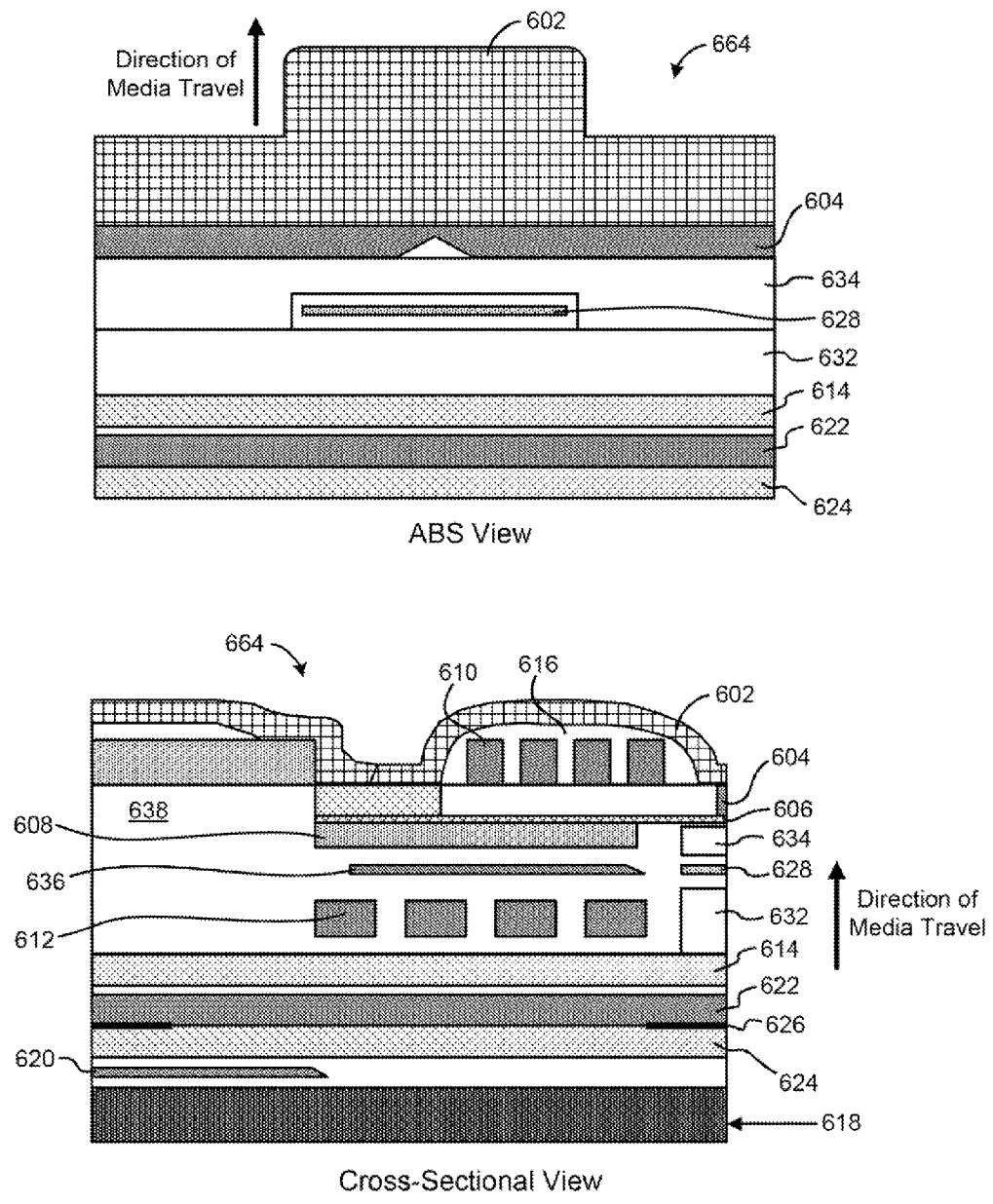
FIG. 6H is a cross-sectional view and an ABS view of a portion of a magnetic head, according to one embodiment.

Now referring to FIG. 6H, a cross-sectional view and an ABS view of a portion of a magnetic head 664 are shown according to one embodiment. In this embodiment, a first TFC element 636 is positioned inside of or between the coils, and possibly in line with the ECS 628 (as shown in FIG. 6H), and closer to the stitch pole 608, main pole 606, ABS 618, and ECS 628, thereby increasing the protrusion effect on one or more of these elements. Also, the magnetic head 664 includes a second TFC element 620 positioned below a leading edge side of the lower return pole 614. In addition, the magnetic head 664 includes a P1 pedestal 632 positioned near the leading edge side of the ECS 628 and a LES 634 near the trailing edge side of the ECS 628, which provide wear resistance, among other advantages, to the ECS 628. The P1 pedestal 632 extends and contacts the lower return pole 614, but is not limited to such an arrangement, as it may be isolated from the lower return pole 614 by electrically isolating layer 638. As shown in the ABS view, the LES 634 wraps around three sides of the ECS 628, thereby providing additional protection to the ECS 628.

Referring again to FIGS. 6A-6H, several views of a magnetic head are shown to illustrate possible locations and combinations of a LES and a P1P pedestal. In a preferred embodiment, a magnetic head includes a TD pad comprising a P1 pedestal in combination with a leading edge shield. The P1 pedestal may be magnetically coupled to, or magnetically floating on, the lower return pole. While the preferred embodiment includes both a P1 pedestal and a LES, each of the described embodiments and combinations of TD pad elements capably achieves the desired improvements to touch-down detection sensitivity, reliability, and longevity.

Also, FIGS. 6A-6H illustrate possible locations of TFC elements according to several embodiments. In practice, the TFC elements may be positioned in any combination of described and undescribed possible locations, including all possible locations, so long as at least one TFC element is present. Each of these possible arrangements enhances the desired improvements to touch-down detection sensitivity, reliability, and longevity.

Figure 7:
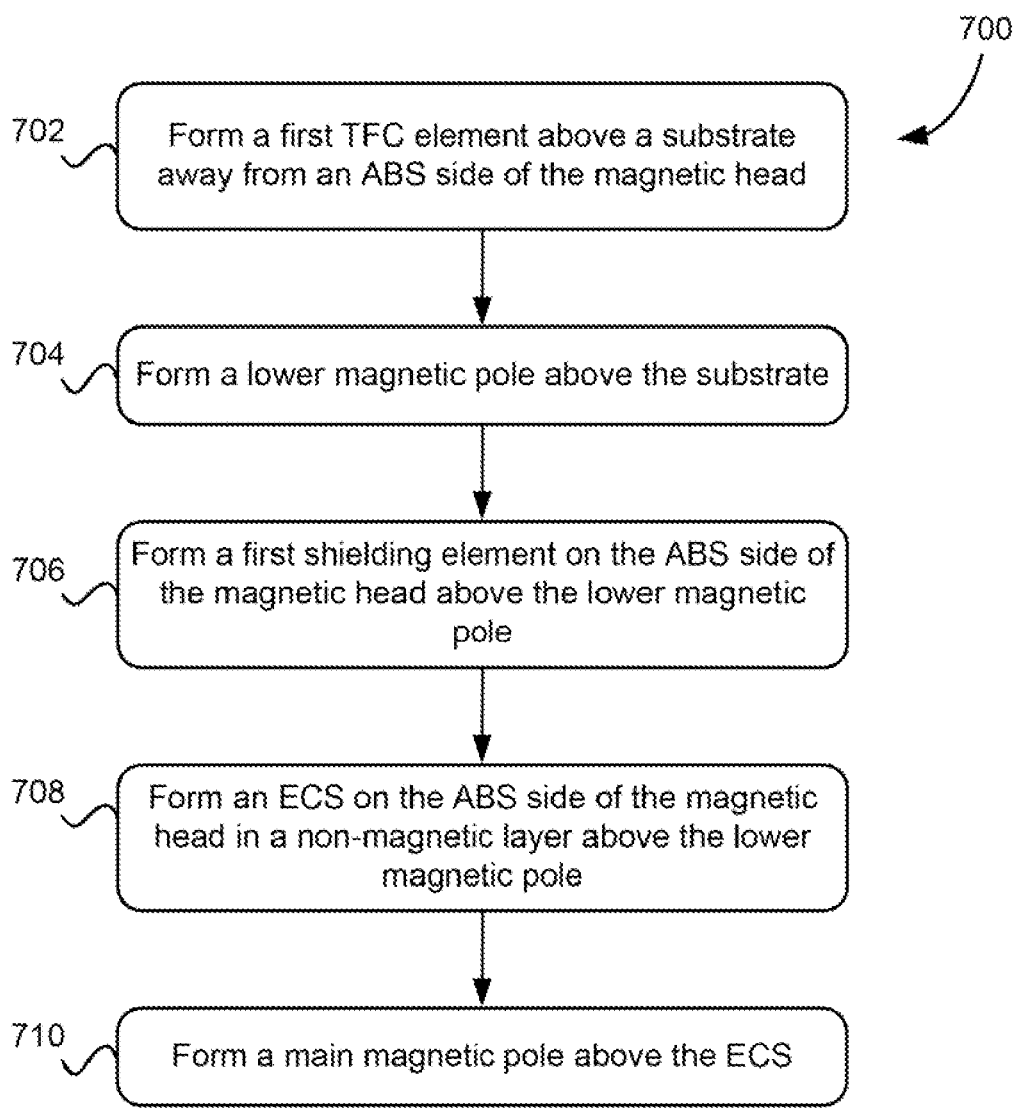
FIG. 7 is flowchart of a method for forming a portion of a magnetic head, according to one embodiment.

Now referring to FIG. 7, a method 700 for forming a magnetic head is shown according to one embodiment. The method 700 may be performed in any desired environment, and may include any of the embodiments and/or approaches described herein, including FIGS. 1-6H. The method 700 may include more or less steps than those described below.

In operation 702, a first thermal fly-height control (TFC) element is formed above a substrate and away from an ABS side of the magnetic head, In operation 704, a lower return pole is formed above the substrate.

In operation 706, a first shielding element is formed on the ABS side of the magnetic head above the lower return pole.

In operation 708, an embedded contact sensor (ECS) is formed on the ABS side of the magnetic head in an electrically isolating layer above the lower return pole. The electrically isolating layer may be a multilayer.

In operation 710, a main magnetic pole is formed above the ECS.

According to various embodiments, the first shielding layer may be formed on the lower return pole and isolated from the ECS by the electrically isolating layer, the method 700 may include forming a second shielding layer above the ECS and below the main magnetic pole, the second shielding layer is isolated from the ECS by the electrically isolating layer, the second shielding layer may surround three side of the ECS, the first shielding layer may be isolated from the lower return pole by the electrically isolating layer and isolated from the ECS by the electrically isolating layer, the method 700 may include forming a second thermal TFC element on the lower return pole away from the ABS side of the magnetic head, the first TFC element may be formed below the lower return pole, the method 700 may include forming a second thermal TFC element away from the ABS side of the magnetic head in a plane of deposition of the ECS, etc.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
a touch-down pad, comprising at least one shielding element positioned between a leading edge of a main magnetic pole and a trailing edge of a lower return pole;
an embedded contact sensor (ECS) in an electrically isolating layer, the ECS positioned near an ABS side of the magnetic head and between the leading edge of the main magnetic pole and the trailing edge of the lower return pole; and
a first thermal fly-height control (TFC) element positioned away from the ABS side of the magnetic head.

2. The magnetic head of claim 1, wherein the touch-down pad comprises a leading edge shield (LES) positioned on the ABS side of the magnetic head between the leading edge of the main magnetic pole and a trailing edge of the ECS, wherein a leading edge of the LES is isolated from the ECS by the electrically isolating layer.

3. The magnetic head of claim 2, wherein the touch-down pad further comprises a P1 pedestal positioned on the ABS side of the magnetic head and on the trailing edge of the lower return pole, and wherein a trailing edge of the P1 pedestal is isolated from the ECS by the electrically isolating layer.

4. The magnetic head of claim 2, wherein the touch-down pad further comprises a P1 pedestal positioned on the ABS side of the magnetic head and between the trailing edge of the lower return pole and a leading edge of the ECS, wherein a trailing edge of the P1 pedestal is isolated from the ECS by the electrically isolating layer, and wherein a leading edge of the P1 pedestal is electrically isolated from the lower return pole.

5. The magnetic head of claim 2, wherein the LES surrounds three sides of the ECS.

6. The magnetic head of claim 1, wherein the touch-down pad comprises a P1 pedestal positioned on the ABS side of the magnetic head and on the trailing edge of the lower return pole, and wherein a trailing edge of the P1 pedestal is isolated from the ECS by the electrically isolating layer.

7. The magnetic head of claim 1, wherein the touch-down pad comprises a P1 pedestal positioned on the ABS side of the magnetic head and between the trailing edge of the lower return pole and a leading edge of the ECS, wherein a trailing edge of the P1 pedestal is isolated from the ECS by the electrically isolating layer, and wherein a leading edge of the P1 pedestal is isolated from the lower return pole by the electrically isolating layer.

8. The magnetic head of claim 1, wherein the first TFC element is positioned away from an ABS side of the magnetic head and below a lower shield layer.

9. The magnetic head of claim 8, further comprising a second TFC element positioned in a plane of deposition of the ECS.

10. The magnetic head of claim 8, further comprising a second TFC element positioned between the lower return pole and a coil layer.

11. The magnetic head of claim 1, wherein the first TFC element is positioned between the lower return pole and a coil layer.

12. The magnetic head of claim 1, wherein the first TFC element is positioned in a plane of deposition of the ECS.

13. The magnetic head of claim 12, further comprising a second TFC element positioned between the lower return pole and a coil layer.

14. A system, comprising:
a magnetic recording medium;
at least one magnetic head as recited in claim 1 for reading from and/or writing to the magnetic recording medium;
a magnetic head slider for supporting the magnetic head; and
a control unit coupled to the magnetic head for controlling operation of the magnetic head.

15. A magnetic head, comprising:
an embedded contact sensor (ECS) in an electrically isolating layer positioned near an ABS side of the magnetic head and between a leading edge of a main magnetic pole and a trailing edge of a lower return pole;
a touch-down pad, comprising:
a leading edge shield (LES) positioned on the ABS side of the magnetic head between the leading edge of the main magnetic pole and a trailing edge of the ECS, wherein a leading edge of the LES is isolated from the ECS by the electrically isolating layer, and wherein the LES surrounds one to three sides of the ECS; and a P1 pedestal positioned on the ABS side of the magnetic head and on the trailing edge of the lower return pole, wherein a trailing edge of the P1 pedestal is isolated from the ECS by the electrically isolating layer;

a first thermal fly-height control (TFC) element positioned away from the ABS side of the magnetic head and below a lower shield layer; and a second TFC element positioned between the lower return pole and a coil layer.

16. A method for forming a magnetic head, the method comprising:

forming a first thermal fly-height control (TFC) element above a substrate away from an ABS side of a magnetic head;

forming a lower return pole above the substrate;

forming a first touch-down (TD) pad on the ABS side of the magnetic head above the lower return pole;

forming an embedded contact sensor (ECS) on the ABS side of the magnetic head in an electrically isolating layer above the lower return pole; and forming a main magnetic pole above the ECS.

17. The method according to claim 16, wherein the first TD pad is formed on the lower return pole and isolated from the ECS by the electrically isolating layer.

18. The method according to claim 17, further comprising forming a second TD pad above the ECS and below the main magnetic pole, wherein the second TD pad is magnetically isolated from the ECS.

19. The method according to claim 18, wherein the second TD pad surrounds three sides of the ECS.

20. The method according to claim 16, wherein the first TD pad is isolated from the lower return pole by the electrically isolating layer and isolated from the ECS by the electrically isolating layer.

21. The method according to claim 20, further comprising forming a second TD pad above the ECS and below the main magnetic pole, wherein the second TD pad is isolated from the ECS by the electrically isolating layer.

22. The method according to claim 21, wherein the second TD pad surrounds three sides of the ECS.

23. The method according to claim 16, further comprising forming a second TFC element on the lower return pole away from the ABS side of the magnetic head, wherein the first TFC element is formed below the lower return pole.

24. The method according to claim 16, further comprising forming a second TFC element away from the ABS side of the magnetic head in a plane of deposition of the ECS, wherein the first TFC element is formed below the lower return pole.

25. A system, comprising:

a magnetic recording medium;

at least one magnetic head as recited in claim 15 for reading from and/or writing to the magnetic recording medium;

a magnetic head slider for supporting the magnetic head; and a control unit coupled to the magnetic head for controlling operation of the magnetic head.

* * * * *

UNITED STATES PATENT AND TRADEMARK OFFICE
CERTIFICATE OF CORRECTION

| | |
|---|---|
| PATENT NO. | : 8,335,053 B2 |
| APPLICATION NO. | : 12/914883 |
| DATED | : December 18, 2012 |
| INVENTOR(S) | : Chen et al. |

It is certified that error appears in the above-identified patent and that said Letters Patent is hereby corrected as shown below:

In the specification:

col. 7, line 57 replace "in" with --In--.

Signed and Sealed this
Fourteenth Day of May, 2013

Teresa Stanek Rea
*Acting Director of the United States Patent and Trademark Office*